(12) United States Patent
Levine

(10) Patent No.: US 7,431,806 B2
(45) Date of Patent: Oct. 7, 2008

(54) LOW ENERGY VACUUM DISTILLATION METHOD AND APPARATUS

(75) Inventor: Michael R. Levine, Boca Raton, FL (US)

(73) Assignee: LEV Group, LLC, Ann Arbor, MI (US)

( * ) Notice: Subject to any disclaimer, the term of this patent is extended or adjusted under 35 U.S.C. 154(b) by 30 days.

(21) Appl. No.: 11/035,339

(22) Filed: Jan. 13, 2005

(65) Prior Publication Data
US 2005/0178648 A1 Aug. 18, 2005

Related U.S. Application Data

(63) Continuation-in-part of application No. 10/665,457, filed on Sep. 19, 2003, now abandoned.

(60) Provisional application No. 60/412,230, filed on Sep. 20, 2002, provisional application No. 60/498,083, filed on Aug. 26, 2003, provisional application No. 60/627,884, filed on Nov. 15, 2004.

(51) Int. Cl.
    B01D 3/10 (2006.01)
    C02F 1/04 (2006.01)
(52) U.S. Cl. .............................. 203/10; 203/11; 203/90; 203/94; 203/98
(58) Field of Classification Search ............. 203/10–11, 203/90–91, 94, 98, 100
See application file for complete search history.

(56) References Cited

U.S. PATENT DOCUMENTS

| | | | |
|---|---|---|---|
| 1,078,323 A | | 11/1913 | Trull |
| 2,490,659 A | | 12/1949 | Snyder |
| 3,423,293 A | | 1/1969 | Holden |
| 3,674,652 A | * | 7/1972 | Brown ......................... 203/11 |
| 3,675,251 A | * | 7/1972 | Ruscher, Jr. ..................... 4/617 |
| 3,816,266 A | * | 6/1974 | Izumi et al. .................... 203/11 |
| 3,948,734 A | * | 4/1976 | Kohl et al. .................. 202/173 |
| 4,009,082 A | | 2/1977 | Smith, Jr. |
| 4,078,976 A | * | 3/1978 | Spears, Jr. ..................... 203/10 |
| 4,083,189 A | * | 4/1978 | Fetkovich .................. 60/641.7 |
| 4,302,297 A | | 11/1981 | Humiston |
| 4,319,964 A | | 3/1982 | Katz et al. |

(Continued)

FOREIGN PATENT DOCUMENTS

FR 2 265 430 10/1975

(Continued)

*Primary Examiner*—Virginia Manoharan
(74) *Attorney, Agent, or Firm*—Gifford, Krass, Sprinkle, Anderson & Citkowski, P.C.

(57) ABSTRACT

A sub-atmospheric pressure desalinating still employs a closed top, open bottom pipe filled with source water to be distilled, such as seawater, having a height greater than the height of a column of seawater that can be supported by the pressure at the bottom of the tank so that a subatmospheric pressure volume is formed at the top. Water from the source is also pumped into the subatmospheric volume and passed through an evaporator which enlarges its surface volume. A small percentage of the water is vaporized and the balance is cooled to provide the heat of vaporization and falls into the top of the seawater column, creating a downward flow. The vapor is drawn from the vacuum and condensed, preferably in a second subatmospheric volume above a column of fresh water.

4 Claims, 3 Drawing Sheets

U.S. PATENT DOCUMENTS

| | | | | |
|---|---|---|---|---|
| 4,319,965 A | * | 3/1982 | Parker | 202/205 |
| 4,370,860 A | * | 2/1983 | Assaf | 60/641.11 |
| 4,444,623 A | * | 4/1984 | Youngner | 202/185.2 |
| 4,525,243 A | | 6/1985 | Miller | |
| 4,536,257 A | | 8/1985 | Atwell | |
| 4,555,307 A | | 11/1985 | Hagen | |
| 4,686,009 A | | 8/1987 | McCabe | |
| 4,710,272 A | | 12/1987 | Passarelli et al. | |
| 5,509,996 A | * | 4/1996 | Assaf | 159/48.2 |
| 6,436,242 B1 | | 8/2002 | Sanchez Belmar | |
| 6,635,149 B1 | * | 10/2003 | Campbell et al. | 202/160 |
| 6,767,471 B2 | * | 7/2004 | Max | 210/702 |

FOREIGN PATENT DOCUMENTS

| | | |
|---|---|---|
| GB | 997 078 | 6/1965 |
| IL | 2004/000319 | 10/2004 |
| WO | WO 2004/074187 | 9/2004 |
| WO | WO 2005/082784 | 2/2005 |

* cited by examiner

LOW ENERGY VACUUM DISTILLATION METHOD AND APPARATUS

RELATED APPLICATIONS

This application is a continuation-in-part of U.S. patent application Ser. No. 10/665,457 filed Sep. 19, 2003 abandoned, which claims priority of U.S. Provisional Patent Application Ser. No. 60/412,230 filed Sep. 20, 2002, and U.S. Provisional Patent Application Ser. No. 60/498,083 filed Aug. 26, 2003. This application also claims priority of U.S. Provisional Patent Application Ser. No. 60/627,884 filed Nov. 15, 2004.

BACKGROUND OF THE INVENTION

1. Field of the Invention

This invention relates to a system for distilling seawater or polluted water to produce fresh water.

2. Background Art

A number of devices and methods have been utilized to purify seawater and brackish water to produce water of lower salinity for irrigation or drinking purposes. Because of the complexity and high power requirements of these systems they have had only limited commercial application.

U.S. Pat. No. 6,436,242 discloses a water distiller using a sub-atmospheric boiler which employs a vacuum pump to reduce the pressure at the top of a tank below that of the atmosphere. The system additionally employs a compressor for the vapor which is presumably powered from an external power supply. The energy requirements for this system are high and its complexity limits its use to specialized situations.

SUMMARY OF THE INVENTION

The present invention is directed toward a still useful as a desalinator which is extremely simple so as to be low in initial cost and maintenance free, and to a condenser employing similar features useful to condense the vapor output of the still of the present invention or other stills.

The system of the present invention utilizes a sub-atmospheric still in which the low pressure is preferably obtained by a liquid column closed at its top and opened at its bottom to a body of seawater, the column having a vertical height greater than the height of a column of seawater that can be supported by the atmospheric pressure that is exerted on the bottom of the column, so that a Torricellian vacuum is created at the top of the column. The seawater at the top of the column boils or evaporates into this vacuum. Additionally, seawater is drawn from the source by a pump and introduced into the vacuum area of the tank. A small fraction vaporizes and the larger fraction is cooled to provide the heat of vaporization. The surplus seawater falls by gravity down the column. Vapor in the vacuum area is drawn off by either a vapor compressor, or under favorable circumstances, by a vacuum in a condenser for the vapor.

The withdrawn vapor may be condensed in a second Torricelli vacuum chamber that is connected by a water column to a reservoir of cool fresh water such as an aqueduct, an aquifer or the like. The vapor withdrawn from the evaporator vacuum volume flows into the condenser vacuum volume. Pressurized fresh water from the reservoir is introduced into the condenser vacuum volume and cools the vapor which condenses and falls by gravity into the fresh water column.

The still column of the present invention could be supported directly on the bottom of a body of water to be purified. A series of these stills could whose pumps might be powered by wind could be positioned along the coast in the same manner that wind turbines are located in areas of high wind velocity and their fresh water outputs could be pooled to form a relatively high volume source.

Other objects, advantages and applications of the invention will be made apparent by the following description of the preferred embodiment of the invention.

The description makes reference to the accompanying drawings in which:

DETAILED DESCRIPTION OF THE INVENTION

Figure 1:
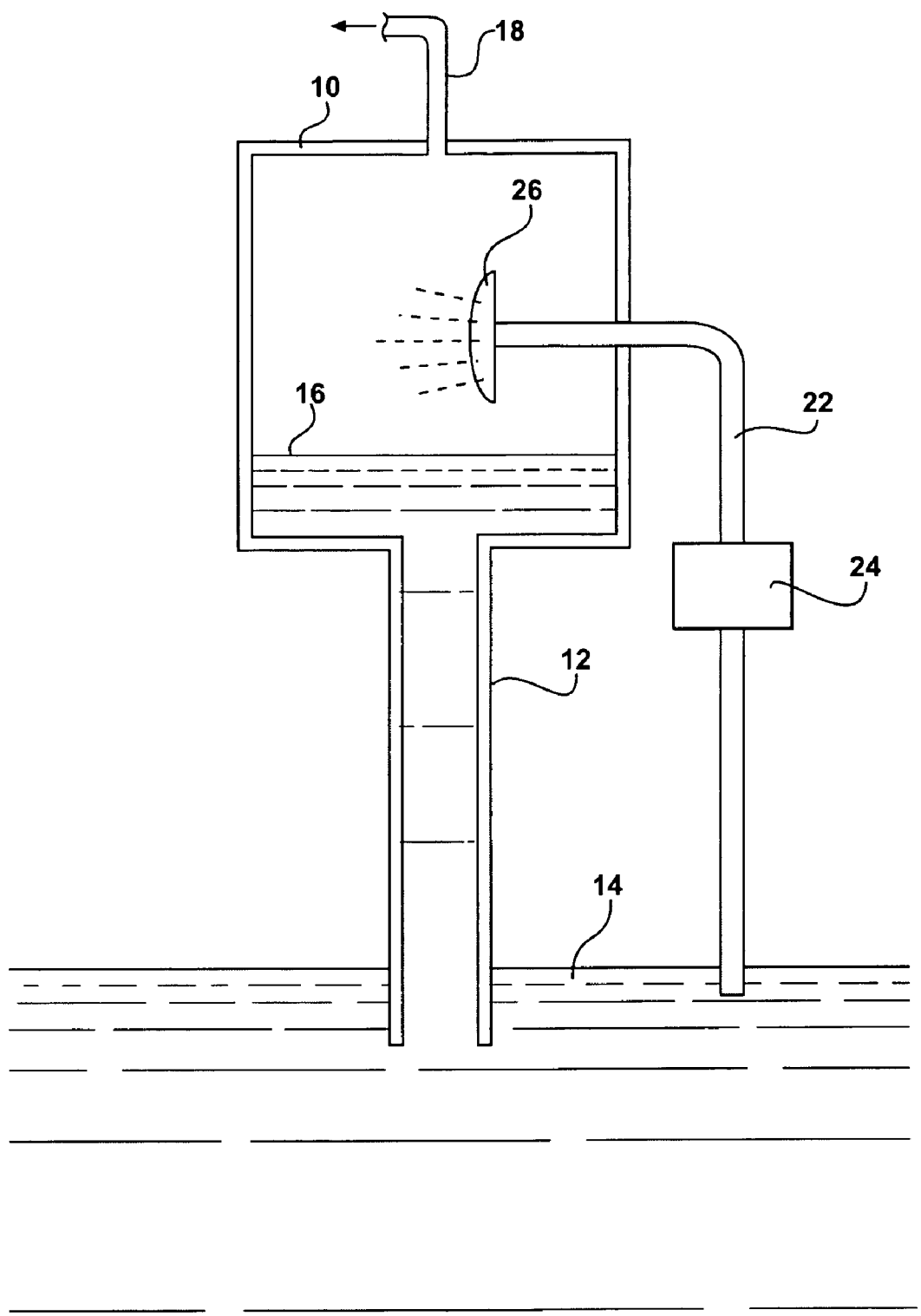
FIG. 1 is a schematic diagram of a first embodiment of an evaporator formed in accordance with my invention.

A preferred embodiment of the invention is schematically illustrated in FIG. 1. The system employs a chamber 10, which is generally sealed and has its lower end connected to an exit pipe 12 which in turn has its lower end disposed in a body of water to be purified 14, preferably seawater or brine, hereinafter termed "source water". The height of the water column in pipe 12 is such that the surface 16 of the water level within the chamber 10 is at the maximum height that can be supported by the atmospheric pressure on the lower end of the conduit 12 less the pressure within the chamber 10, typically approximately 10 meters. As a result, the volume in the chamber 10 above the water surface 16 is substantially evacuated to a subatmospheric pressure (a "Torricelli vacuum") and filled with water vapor at a vapor pressure corresponding to the temperature of the water in the chamber 10. The water vapor drawn out of the chamber 10 through conduit 18 represents the distilled output of the evaporator.

The chamber 10 simply constitutes an enlargement of the pipe 12 which acts to enlarge the surface area at the top of the column.

To enhance the generation of water vapor within the chamber 10, it is desirable to maintain the maximum temperature within the evaporator chamber 10. Accordingly, undistilled water from the source body 14 is pumped up a conduit 22 by a pump 24. The pump has an outlet within the evaporator chamber 14 and its output is through one or more spray heads 26 within the evaporator chamber 10. The spray acts to maximize the surface area of the introduced water. In alternative embodiments the pumped water could be cascaded over inclined planar surfaces or otherwise operated on to maximize its area exposed to the vacuum and thus enhance the evaporation of the water introduced. It may be generically termed an "evaporator." The volume of water pumped through the conduit 22 is such that only a small percentage of the undistilled water forced out of the spray head 26 is vaporized. The larger volume of spray joins the body of water within the volume 10 and causes a downward flow through the exit pipe 12, maintaining the vacuum in the chamber 10 and a constant water level.

Assuming that 1% of the spray through the head 26 is vaporized, the approximately 540 calories of vaporization per gram vaporized will cool the other 99% of the water. Accordingly, if 100 grams of water is pumped through the conduit 22, the water which is not vaporized by the spray head is lowered in temperature by about 5.4° C. This process maintains the temperature in the chamber 10 despite the cooling effect of the vaporization.

The system may be initialized by opening the chamber 10 to the atmosphere, closing the bottom of the exit 12, filling the chamber 10 and column with seawater, and then closing the chamber 10 to the atmosphere and opening the bottom of the tube 12.

Figure 2:
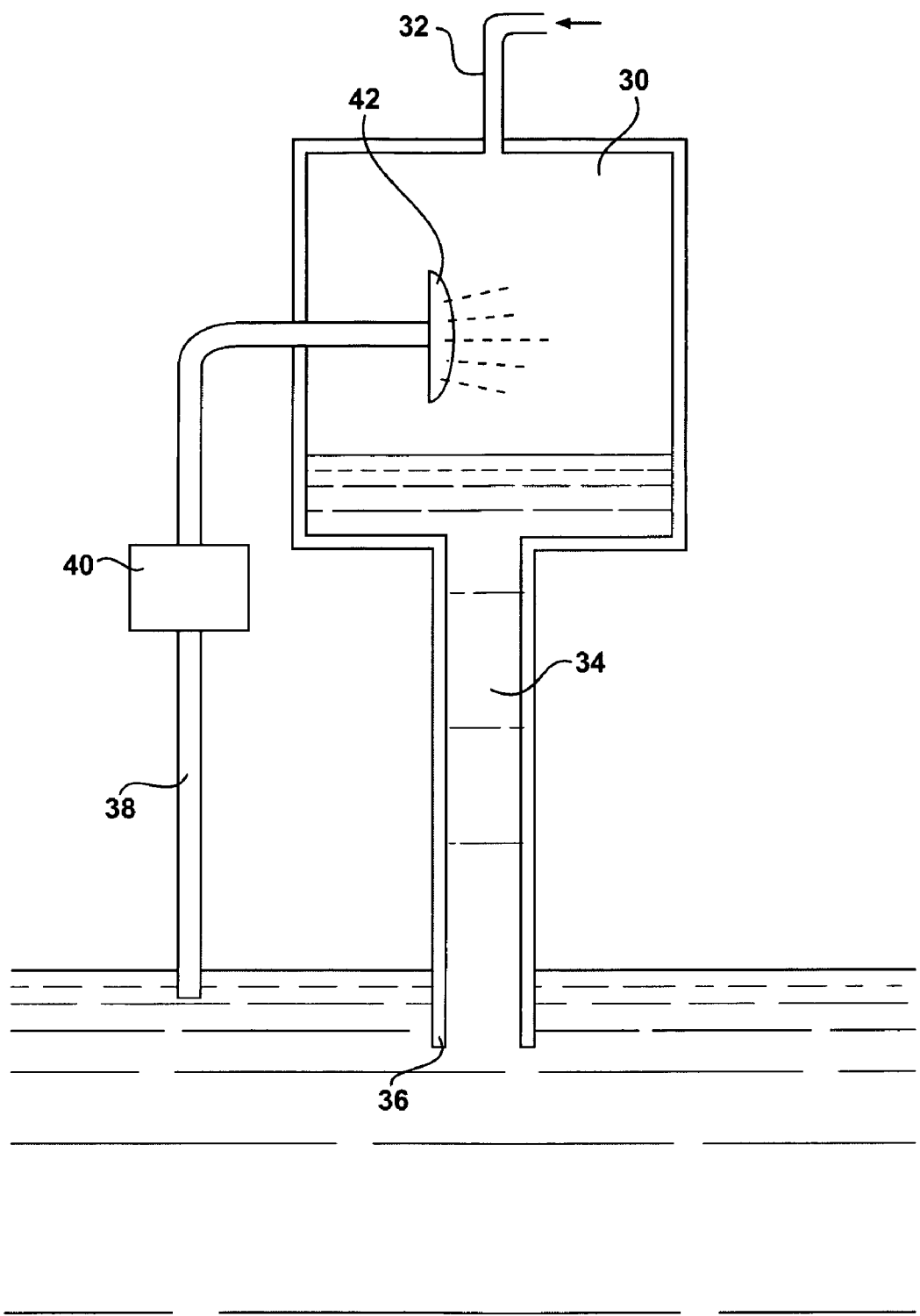
FIG. 2 is a schematic diagram of a condenser formed in accordance with my invention.

FIG. 2 is an illustration of a condenser embodying similar principles to the evaporator of FIG. 1. A Torricelli chamber 30 is supplied with water vapor at a reduced pressure from a conduit 32. The chamber 30 is connected to a conduit 34 that has its lower end disposed within a body of fresh water 36 which may be an aquifer to be replenished by the condensate, an aqueduct, or the like. Again, the height of the water column in the conduit 34 is the maximum level that may be sustained by the atmospheric pressure on the body of fresh water 36. Thus, a volume filled with water vapor is formed at the top end of the chamber 30. Fresh water from the body 36 is pumped upwardly through a conduit 38 by a pump 40 and exits within the evacuated area at the top of the chamber 30 by one or more sprays 42 or other evaporator apparatus for maximizing the surface area of the water introduced into the chamber 30. The portion of the fresh water which does not evaporate joins the water in the conduit 34, causing a downward flow from the chamber 30 to the main body of water 36. The cool spray water will condense the vapor introduced through the conduit 32 on itself. This condensation will heat the water introduced, causing a temperature increase for fresh water leaving the conduit 34. This heated water is being replaced by cool water coming in the spray head thus providing a colder surface for condensation.

Figure 3:
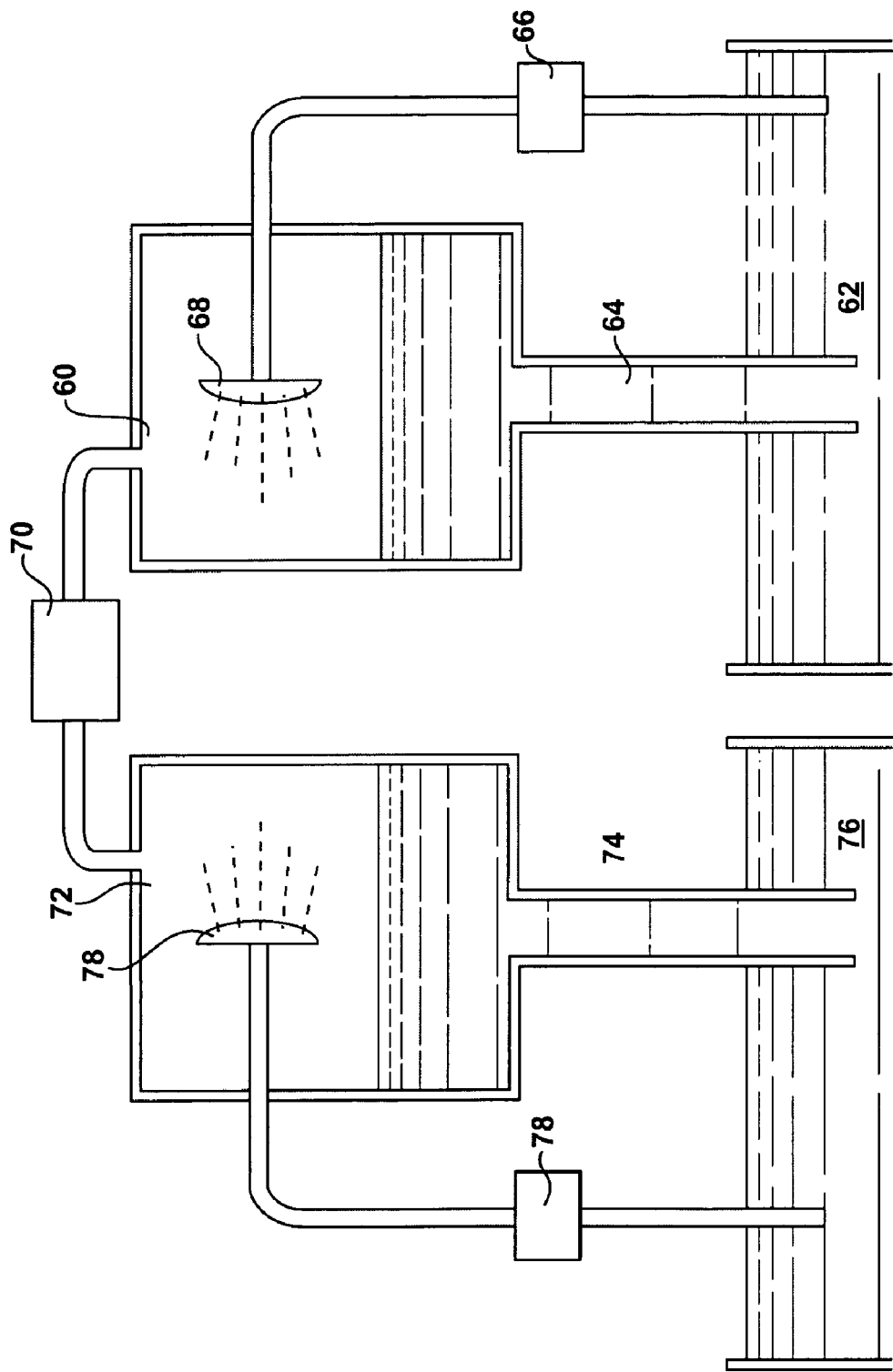
FIG. 3 is a schematic diagram of an evaporator-condenser system formed in accordance with my invention.

FIG. 3 shows another alternative embodiment of my invention comprising a system in which a pair of Torricellian vacuum devices are employed, one having a column of salt water and acting as an evaporator and the second having a column of fresh water and acting as a condenser, with a vapor compressor communicating their two vacuum areas. A first enclosed chamber 60 is connected to a source of seawater 62 to be distilled, by a column 64 which has a height exceeding the height which can be supported by the atmospheric pressure at the bottom of the column, so as to produce a Torricellian vacuum in the chamber 60, above the water level in the column. The chamber 60 is provided by a spray of seawater via a pump 66, feeding a spray head 68 within the chamber 60. The pump draws from the body of seawater 62. The vapor which results from the spray action is drawn out of the chamber 60 by a pump 70, which feeds a second Torricellian chamber 72 having its column 74 suspended within a body of fresh water 76. A pump 78 draws fresh water from the source 76 and forces it through a spray head 78.

The energy required to drive the pump 70 is a function of the difference in temperature between the seawater source 62 and the fresh water 76. The unit 72 acts as a condenser and the cooler the fresh water sprayed into the tank 72, the less the pressure differential between the tanks 60 and 72, and the less energy required by the pump 70. With a sufficiently cool supply of heat exchanging media for the condenser, no pump is required, rather the lower vapor pressure in the condenser will draw vapor from the higher pressure evaporator without the need for a pump. The vacuum in the condenser chamber allows removal of the condensed water while still maintaining the vacuum in the evaporator.

Having thus described my invention, I claim:

1. The method of replenishing a body of fresh water with distillate of water vapor derived from a body of salt water, comprising:

spraying salt water from the body of salt water into a first chamber elevated above the body of salt water and connected by a first conduit, filled with water, extending from the bottom of the first chamber into the body of salt water to maintain a subatmospheric pressure in the first chamber to vaporize the salt water spray;

feeding the resulting vapor into a second chamber elevated above the body of fresh water and connected by a second conduit, filled with water, extending from the bottom of the second chamber into the body of fresh water to maintain a subatmospheric pressure in the second chamber; and spraying fresh water from the body of fresh water into the second chamber to condense the fed vapor so that the condensed vapor flows through the second conduit to the body of fresh water.

2. The method of claim 1 in which the body of fresh water is cool relative to the vapor.

3. The method of claim 1 in which the body of fresh water is an aquifer.

4. The method of claim 1 in which the body of fresh water is an aqueduct.

* * * * *